United States Patent [19]

Liles

[11] Patent Number: 5,321,075
[45] Date of Patent: * Jun. 14, 1994

[54] PRECURED SILICONE EMULSION

[75] Inventor: Donald T. Liles, Midland, Mich.

[73] Assignee: Dow Corning Corporation, Midland, Mich.

[ * ] Notice: The portion of the term of this patent subsequent to Sep. 8, 2009 has been disclaimed.

[21] Appl. No.: 905,986

[22] Filed: Jun. 29, 1992

Related U.S. Application Data

[63] Continuation-in-part of Ser. No. 576,570, Aug. 31, 1990, Pat. No. 5,145,907.

[51] Int. Cl.⁵ ............................................. C08L 83/00
[52] U.S. Cl. ................................... 524/837; 524/789; 524/588; 524/869; 524/863; 524/861; 524/860; 528/18
[58] Field of Search ............... 524/789, 588, 837, 869, 524/863, 861, 860; 528/18

[56] References Cited

U.S. PATENT DOCUMENTS

| | | | |
|---|---|---|---|
| 4,595,610 | 6/1986 | Fey et al. | 524/863 |
| 4,889,770 | 12/1989 | Ona et al. | 524/860 |
| 4,892,907 | 1/1990 | Lampe et al. | 524/863 |
| 4,954,565 | 9/1990 | Liles | 524/860 |
| 5,145,907 | 9/1992 | Kalinowski et al. | 524/789 |

*Primary Examiner*—Ralph H. Dean
*Assistant Examiner*—Karen A. Dean
*Attorney, Agent, or Firm*—Roger H. Borrousch

[57] ABSTRACT

A shelf stable aqueous silicone emulsion which yields an elastomer upon removal of the water is produced by combining a reactive polydiorganosiloxane present as an cationic or nonionic emulsion of dispersed particles in water, an acyloxysilane crosslinker, and a tin catalyst, the tin catalyst being in the form of a divalent tin atom combined with organic radicals. The emulsion can be reinforced with colloidal silica without effecting the shelf life of the reinforced emulsion.

16 Claims, No Drawings

PRECURED SILICONE EMULSION

This is a continuation-in-part of copending application Ser. No. 07/576,570 filed on Aug. 31, 1990 now U.S. Pat. No. 5,145,907.

BACKGROUND OF THE INVENTION

1. Field of the Invention

This invention relates to an aqueous silicone emulsion which gives a silicone elastomer upon removal of the water under ambient conditions.

2. Background Information

A silicone rubber latex reinforced with silsesquioxane is taught in U.S. Pat. No. 3,355,406, issued Nov. 28, 1967, by Cekada. He teaches a latex containing a curable, essentially linear silicone polymer, preferably a hydroxy or alkoxy endblocked linear polymer having been prepared by emulsion polymerization, a crosslinking agent which is a trifunctional or tetrafunctional silane, preferably trialkoxysilane, and a catalyst. Included in the catalysts are dialkyltindiacylates.

Ichikawa, et al. describe silicone compositions which are useful as binders for fibrous gasketing and packing materials in U.S. Pat. No. 4,100,124, issued Jul. 11, 1978. The compositions are a mixture of hydroxyl endblocked diorganosiloxanes, a crosslinking trialkoxysilane, catalyst, emulsifier, and water.

Johnson et al. describe in U.S. Pat. No. 4,221,688, issued Sep. 9, 1980, a silicone emulsion which provides an elastomeric product and methods for it's preparation. The emulsion comprises a continuous aqueous phase and a dispersed phase, the dispersed phase consisting essentially of an anionically stabilized hydroxylated polydiorganosiloxane which contains about 2 silicon-bonded hydroxyls per molecule, an organic tin compound, and a colloidal silica, the emulsion having a pH in the range of 9 to 11.5 inclusive. Experience with such emulsions has now shown that there is a problem with the shelf life of the emulsion, which is manifested by a change in properties of the elastomer obtained upon drying as the emulsion ages; and, in addition, a change in properties upon aging of the elastomer produced by the removal of water from the emulsion.

A silicone elastomeric emulsion having improved shelf life is taught by Elias and Freiberg in U.S. Pat. No. 4,427,811, issued Jan. 24, 1984. The emulsion is produced by a method which first mixes an anionically stabilized, hydroxyl endblocked polydiorganosiloxane, colloidal silica, and an alkyl tin salt, then ages the mixture for at least two weeks at room temperature, then adds filler other than colloidal silica. The alkyl tin salt is preferably a dialkyltindicarboxylate.

U.S. Pat. No. 4,590,220, issued May 20, 1986 teaches a method of producing silicone elastomers from emulsion. The mixture can be stored as a two-part system and is useful in making foam. The method combines anionically stabilized, hydroxyl endblocked polydiorganosiloxane emulsion, dialkyltindicarboxylate, alkylorthosilicate, colloidal silica and optionally, water.

A different type of aqueous emulsion is taught in U.S. Pat. No. 4,618,642, issued Oct. 21, 1986, by Schoenherr. This composition consists essentially of an anionically stabilized, hydroxyl endblocked polydiorganosiloxane, a dialkyltindicarboxylate, a trifunctional silane cross-linking agent, and a non-siliceous, inert filler. The filler is non-siliceous since the shelf life will be affected if a silica filler is present because the composition still contains the hydroxylated polydiorganosiloxane and organic tin compound as found in Johnson et al.

U.S. Pat. No. 4,954,565, issued Sep. 4, 1990 combines a hydroxyl endblocked polydiorganosiloxane emulsion crosslinker, and a tin catalyst in the form of a divalent tin atom combined with organic radicals.

SUMMARY OF THE INVENTION

This invention encompasses a process for producing an aqueous silicone emulsion which gives an elastomer upon removal of the water which can be reinforced with a silica filler and still retain its properties upon aging, the shelf stable aqueous silicone emulsion resulting from the process, and the elastomer produced by removal of the water from the emulsion. The process combines an ionically or nonionically stabilized polydiorganosiloxane emulsion, the polydiorganosiloxane having at least two reactive groups per molecule; a stoichometric amount of acyloxysilane crosslinker when the polydiorganosiloxane has only 2 reactive groups per molecule; and a tin (II) catalyst, such as stannous octoate. The emulsion can be reinforced with colloidal silica, without loss of shelf life.

DESCRIPTION OF THE INVENTION

This invention relates to an aqueous silicone emulsion stabilized anionically, cationically or nonionically or by a combination which yields an elastomer upon removal of the water comprising (1) 100 parts by weight of anionically, cationically or nonionically stabilized polydiorganosiloxane emulsion, the polydiorganosiloxane having at least two reactive groups per molecule, the organo radicals being monovalent hydrocarbon radicals containing less than 7 carbon atoms per radical or 2-(perfluoroalkyl)ethyl radicals having less than 7 carbon atoms per radical, the reactive groups selected from the atoms or radicals consisting of (a) hydrogen, (b) OR, where R is hydrogen, monovalent hydrocarbon radical or substituted hydrocarbon radical having less than 7 carbon atoms, functionalized hydrocarbon radicals, nitrogen compounds of the formula $-N=CR'_2$ or $-NR'COR'$ or $-NR'_2$, where R' is either hydrogen or monovalent hydrocarbon radicals having less than 7 carbon atoms, (c) groups of the formula $-NR_2$ or $-N-COR$, where R is as defined above, and (d) halogen, and (g) $-O2CR'$, (2) from 0.1 to 10 parts by weight of tin (II) catalyst, and, when (1) has only 2 reactive groups per molecule, (3) sufficient crosslinker of the formula $R_xSi(O_2CR')_{4-x}$ where R and R' are as defined above and x is 0 or 1, the emulsion being able to be filled with either reinforcing or extending fillers or pigments or combinations thereof, the emulsion yielding an elastomer upon evaporation of the water.

This invention relates to a process for producing an aqueous silicone emulsion stabilized anionically, cationically or nonionically or by a combination which yields an elastomer upon removal of the water comprising (A) mixing (1) 100 parts by weight of anionically, cationically or nonionically stabilized polydiorganosiloxane emulsion, the polydiorganosiloxane having at least two reactive groups per molecule, the organo radicals being monovalent hydrocarbon radicals containing less than 7 carbon atoms per radical or 2-(perfluoroalkyl)ethyl radicals having less than 7 carbon atoms per radical, the reactive groups selected from the atoms or radicals consisting of (a) hydrogen, (b) OR, where R is hydrogen, monovalent hydrocarbon radical or substituted hydrocarbon radical having less than 7 carbon atoms, functionalized hydrocarbon radicals, nitrogen compounds of the formula —N=CR'$_2$ or —NR'COR' or —NR'$_2$, where R' is either hydrogen or monovalent hydrocarbon radicals having less than 7 carbon atoms, (c) groups of the formula —NR$_2$ or —NCOR, where R is as defined above, and (d) halogen, and (g) —O$_2$CR', (2) from 0.1 to 10 parts by weight of tin (II) catalyst, and when (1) has only 2 reactive groups per molecule, (3) sufficient crosslinker on a stoichometric basis of the formula R$_x$Si(O$_2$CR')$_{4-x}$ where R, R' and x are as defined above, then (B) aging at room temperature for sufficient time to allow crosslinking of the polydiorganosiloxane, to give an emulsion being able to be filled with either reinforcing or extending fillers or pigments or combinations thereof, the emulsion yielding an elastomer upon evaporation of the water.

Hydroxyl endblocked polydiorganosiloxane in emulsion form can be crosslinked to form what is known in the art as precrosslinked or precured silicone emulsions. Removal of water from these precured emulsions produces silicone elastomers. The precured silicone elastomer emulsions described by Johnson et al. in U.S. Pat. No. 4,221,688, are of this type. The useful life (shelf life) of the emulsions of Johnson et al. is limited due to a reaction of the hydroxyl endblocked polydiorganosiloxane and the silica filler in the presence of tetrafunctional tin catalyst. This invention encompasses a process for producing an aqueous silicone emulsion that is precured, but has improved shelf life. Crosslinking is accomplished in the emulsion by reaction of the reactive groups of the polydiorganosiloxane (1) and the crosslinker (3), if used, in the presence of a divalent tin (tin (II)) catalyst.

The anionically, cationically or nonionically stabilized polydiorganosiloxane emulsion used in this invention is now well known in the art. The polydiorganosiloxane is one which can be emulsified, and when crosslinked imparts elastomeric properties to the product obtained after the removal of the water from the emulsion. Tensile strengths and elongations at break improve with increasing weight average molecular weight (Mw). The maximum weight average molecular weight is one which can be emulsified and which will give elastomeric properties to the product obtained after the water is removed from the emulsion. Weight average molecular weights up to about 1,000,000 for the hydroxyl endblocked polydiorganosiloxane are expected to be practical for this invention. The preferred Mw for the hydroxyl endblocked polydiorganosiloxanes are in the range of 200,000 to 700,000. The organo radicals of the polydiorganosiloxane can be monovalent hydrocarbon radicals containing less than seven carbon atoms per radical and 2-(per-fluoroalkyl)ethyl radicals having less than 7 carbon atoms per radical, including 3,3,3-trifluoropropyl and 2-(perfluorobutyl)ethyl. The polydiorganosiloxanes preferably contain organic radicals in which at least 50 percent are methyl. The polydiorganosiloxanes can be linear or branched polymers containing two or more organic groups per silicon atom. A preferred anionically stabilized, hydroxyl endblocked polydiorganosiloxane is that prepared by the method of anionic emulsion polymerization described by Findlay et al. in U.S. Pat. No. 3,294,725, issued Dec. 27, 1966, which is hereby incorporated by reference to show the methods of polymerization, the ingredients used, and the hydroxyl endblocked polydiorganosiloxane obtained in an emulsion. Another method of preparing the anionically stabilized, hydroxyl endblocked polydiorganosiloxane is described by Hyde et al. in U.S. Pat. No. 2,891,920, issued Jun. 23, 1959, which is hereby incorporated by reference to show the hydroxyl endblocked polydiorganosiloxanes, the ingredients used, and their method of preparation. Other methods of preparing polydiorganosiloxane emulsions which are suitable for use in this invention include the methods described in U.S. Pat. Nos. 4,146,499, issued Mar. 27, 1979; 4,177,177, issued Dec. 4, 1979; 4,620,878, issued Nov. 4, 1986; all of which hereby incorporated by reference to show polydioroganosiloxane emulsions and how to prepare them.

The shelf stability of the aqueous silicone emulsion of this invention is the result of the use of divalent tin as the tin catalyst, rather than the tetravalent tin which has been used in the past in aqueous silicone emulsions of this type. The divalent, stannous form of tin does not cause a reaction between the reactive groups of the polydiorganosiloxane and silica as is caused when the tetravalent, stannic form of tin is used as the catalyst. Therefore, when stannous catalyst is combined with reactive polydiorganosiloxane and the crosslinker of this invention, crosslinking occurs readily; and the crosslinked polymer in emulsion can be reinforced with silica without a loss of shelf life. It is desirable that the tin (II) (stannous) catalyst be compatible in the polymer. The tin (II) (stannous) catalyst used in this invention can be any of the organic stannous carboxylates, such as stannous oleate, stannous neodecanoate, or stannous octoate. The preferred stannous catalyst is stannous octoate (stannous bis(2-ethylhexanoate)).

When the polydiorganosiloxane in the emulsion of this invention has only two reactive groups, it is crosslinked by the use of a crosslinker of the formula R$_x$Si(O$_2$CR')$_{4-x}$ where R, R' and x are as defined above.

If the polydiorganosiloxane and the crosslinker are not mixed before emulsification, the crosslinker must be capable of migrating from the aqueous phase into the emulsion micelle of (1). Whether or not crosslinkers will adequately perform in the process of this invention is determined experimentally. Crosslinker and tin (II) catalyst are added with stirring to a sample of the reactive polydiorganosiloxane emulsion and the mixture in allowed to remain undisturbed for 24 hours to complete the crosslinking process. Usually 1 percent crosslinker and 0.5 percent tin (II) catalyst (based upon polymer weight) are sufficient. After crosslinking, films of the emulsion are cast, and after drying, they are examined. If the films are tack free and elastomeric, the crosslinker is suitable; but if the they are non-elastic, the crosslinker is unsuitable. If they are slightly elastomeric and tacky, crosslinking occured to some extent, the crosslinker may be suitable if more is used. For example, silanes of the formula (CH$_3$O)$_3$SiCH$_2$CH$_2$NH$_2$ or (CH$_3$O)$_3$Si(CH$_2$)$_3$NH(CH$_2$)$_2$NH$_2$ did not function when used with a hydroxyl endblocked polydimethylsiloxane emulsion due to the fact that they remained in the aqueous phase when added to the emulsion and did not migrate into the micelle so that the reaction with the hydroxyl endblocked polymer could take place. Other crosslinkers which were found unsuitable included (CH$_3$O)$_3$Si(CH$_2$)$_2$C$_6$H$_4$SO$_2$N$_3$ and (CH$_3$CH$_2$O)$_3$Si(CH$_2$)$_3$N=C=O. A silane of the formula (CH$_3$O)$_3$SiCH$_2$CH$_2$NHC$_6$H$_5$ did provide a crosslinked emulsion polymer since this silane does migrate into the micelle.

R can be hydrogen; a monovalent hydrocarbon radical or substituted hydrocarbon radical such as an alkyl radical, for example methyl, ethyl, propyl, isopropyl, and butyl, an alkenyl radical such as vinyl or allyl, a halogenated hydrocarbon such as chloropropyl or trifluoropropyl, an aryl radical such as phenyl, functionalized hydrocarbon radicals such as glycidoxy, acryl or methacryl, and mercapto, and amine containing radicals such as phenylaminopropyl but not aminopropyl or aminoethylaminopropyl for the reasons given above. R' is chosen from methyl, ethyl, propyl, isopropyl, and butyl.

The crosslinker is an acyloxysilane of the formula $R_xSi(O_2CR')_{4-x}$. R is hydrogen, monovalent hydrocarbon radical or substituted hydrocarbon radical having less than 7 carbon atoms, functionalized hydrocarbon radicals, nitrogen compounds of the formula $-N=CR'_2$ or $-NR'COR'$ or $-NR'_2$, where R' is either hydrogen or monovalent hydrocarbon radicals having less than 7 carbon atoms, and x is 0 or 1. Examples of acyloxysilane crosslinkers include methyltriacetoxysilane, ethyltriacetoxysilane, phenyltriacetoxysilane, and methyl-tris(benzoyloxy)silane. A preferred acyloxysilane is vinyltriacetoxysilane.

When the polydiorganosiloxane of (1) has an average of more than 2 reactive groups per molecule, it is not necessary to have crosslinker (3) present in order to form a crosslinked polymer. The reactive groups on the different polydiorganosiloxane molecules can react with each other to form the required crosslinks. The polydiorganosiloxane (1) can be a mixture of different kinds of molecules, for example long chain linear molecules and short chain linear or branched molecules. These molecules react with each other to form a crosslinked network. Such polydiorganosiloxanes which can take the place of more conventional crosslinkers are illustrated by low molecular weight organosilicon hydrides such as polymethylhydrogensiloxane, low molecular weight copolymers containing methylhydrogensiloxy and dimethylsiloxy groups, $-(OSi(OEt)_2)-$, (ethylpolysilicate), $(OSiMeC_2H_4Si(OMe)_3)_4$, and $(OSiMeON=CR''_2)_4$, where Me is methyl radical and Et is ethyl radical. Silicon compounds other than siloxanes having at least 3 reactive groups per molecule, such as $(MeO)_3SiC_2H_4Si(OMe)_3$ are also suitable, as long as they move from the aqueous phase into the micelle so that they can react with the polymer. It is believed that the non-reactive radicals in the siloxane can be any group as long as it does not inhibit the migration of the siloxane crosslinker into the micelle.

The crosslinked emulsion produced by the method of claim 1 can be reinforced and/or extended through the addition of filler. Any of the common fillers which do not react with the emulsion are suitable. Inert fillers suitable for use in anionic silicone emulsions are well known. The fillers have an average particle size below 10 micrometers, preferably below 2 micrometers. Examples of fillers include carbon blacks, titanium dioxide, aluminum oxide, calcium carbonate, zinc oxide, mica, and various pigments. Titanium oxide has been found to be particularly useful as an ultraviolet light screening agent. The crosslinked emulsion of this invention is particularly useful because it can be reinforced with colloidal silica. Although the common fumed silica can be used as reinforcement, preferred is a collodial silica dispersion. There are commercially available aqueous dispersions of fumed colloidal silica. A preferred silica dispersion is a sol of colloidal silica such as the commercially available Nalcoag (R) silicas from Nalco Chemical Company.

The process of this invention begins by mixing the emulsion of reactive polydiorganosiloxane (1), tin (II) catalyst (2), and crosslinker (3), if used. If the polydiorganosiloxane (1) has greater than 2 reactive groups per molecule, a polydiorganosiloxane endblocked with trialkoxysilyl groups for example, a crosslinker is not necessary to form a crosslinked elasotomer. A crosslinker can be used if desired, even when not necessary. For each 100 parts by weight of hydroxyl endblocked polydiorganosiloxane, there is from 0.1 to 1.0 parts by weight of tin (II) catalyst. The amount of tin catalyst used has an effect upon how long it takes for the polydiorganosiloxane in the emulsion to react to provide a crosslinked polymer within the emulsion micelles. A preferred amount of tin (II) catalyst is from 0.25 to 1.0 parts by weight. The crosslinker, when used is present in an amount from 0.1 to 5 parts by weight. The rate of crosslinking and the modulus of the crosslinked elastomer formed by drying the emulsion can be varied by varying the number of reactive groups present and the molecular weight of the polydiorganosiloxane, as well as the amount of crosslinker used. As more crosslinker is used, the modulus is raised. It is not necessary to add more crosslinker than is required to react with the reactive groups present on the polydiorganosiloxane. A preferred amount of acyloxysilane crosslinker is from 2 to 4 parts by weight. When the crosslinker is a tetrafunctional material, x is 0, while x is 1 for a trifunctional crosslinker. During the process of mixing, preferably, the tin (II) catalyst is added to the emulsion of polydiorganosiloxane first, followed by the crosslinker. The order of mixing is not critical as the crosslinker can be added first, followed by the catalyst, or the crosslinker and catalyst can be mixed together and then added to the polydiorganosiloxane emulsion. As soon as the ingredients are mixed, the reaction between the reactive polydiorganosiloxane and the crosslinker will begin, resulting in the production of crosslinked polymer. The reaction is allowed to proceed until the emulsion gives an elastomer upon removal of the water. This point can be monitored by simply testing a portion of the mixture during the crosslinking process. If the crosslinked emulsion is then allowed to shelf age, the catalyst will gradually become inactive, due to hydrolysis.

At this point in the process, the emulsion can be used to give a coating of a crosslinked polydiorganosiloxane. Such an emulsion could be used for the treatment of paper or fabrics; for example, by coating the substrate, then removing the water.

Reinforcing or extending filler can also be added to the emulsion before or after crosslinking of the polymer. Extending fillers are used to provide opacity, color, higher specific gravity, and reduced cost.

Additional ingredients which can be added to the composition include such things as antifoam to aid during the mixing process, stabilizers such as organic amines, preferably 2-amino-2-methyl-1-propanol, and pigments such as titanium dioxide and carbon black to provide opaqueness or color to the composition.

The emulsions of this invention can be used as coatings, and when filled to give a paste consistency, as sealants and adhesives. When the emulsions of this invention are dried by removal of the water, an elastomer results. Because colloidal silica can be used as a reinforcement without problems of shelf life or useful life, excellent physical properties for the elastomer are possible, regardless of the age of the emulsion.

The following examples are included for illustrative purposes only and should not be construed as limiting the invention which is properly set forth in the appended claims.

EXAMPLE 1

First, 200 g of an anionically emulsified polydimethylsiloxane emulsion having a solids content of about 60 percent by weight, the emulsion particles being less than 0.35 micrometers in average diameter and the polymer having a molecular weight average of greater than 240,000, and having a pH of 10.3, was weighed into a 500 ml jar equipped with a stirrer. Then 0.9 g of stannous octoate was weighed into the jar, the stirrer was started and the mixture was stirred for three minutes. Next 1.2 g of vinyltriacetoxysilane, $CH_2=CHSi(O_2CCH_3)_3$, was added dropwise with stirring. The mixture was stirred for an additional five minutes after addition of all of the silane (crosslinker). The jar was capped and the emulsion was allowed to remain undisturbed for six hours. pH of the emulsion was adjusted to between 9–10 by the dropwise addition with stirring of 14 percent aqueous ammonia. Films were cast by weighing eight grams of emulsion into 100 mm diameter polystyrene Petri dishes and allowing the emulsion to air dry for seven days at ambient conditions. This composition consisted of a polydimethylsiloxane emulsion crosslinked with 0.75 pph stannous octoate and 1 pph vinyltriacetoxysilane, based on polymer weight. Three more samples were prepared under identical conditions except the amount of crosslinker was changed to 2, 3 and 4 pph based on polymer weight. The mechanical properties of the resulting films were obtained and they are given in Table 1.

TABLE 1

| $(MeO)_3SiC=CH_2$ pph | 100% Modulus psi | Tensile psi | Elongation % |
|---|---|---|---|
| 1 | — | no cure | — |
| 2 | 8 | 49 | 839 |
| std. dev | 1 | 7 | 45 |
| 3 | 9 | 53 | 601 |
| std. dev. | 1 | 4 | 71 |
| 4 | 11 | 48 | 377 |
| std. dev. | 0 | 4 | 28 |

EXAMPLE 2

This is a comparative example.

To 200 g of the emulsion of Example 11 was added 0.70 g of stannous octoate (stannous bis(2-ethylhexanoate)) and the emulsion was stirred for 5 minutes. Next, 1.40 g of 3-(2-aminoethylamino)propyltrimethoxysilane was added dropwise to the emulsion with stirring. Following addition of the aminofunctional silane, the emulsion was stirred an additional 3 minutes, the container (one pint jar) was capped and the emulsion was allowed to remain undisturbed for 20 hours at room temperature. A portion of the emulsion was transferred to a small vial and the vial was centrifuged lightly to remove air bubbles from the emulsion. 10 g of emulsion was poured into a 100 mm diameter Petri dish the dish was left uncovered and undisturbed for 24 hours. The resulting film was not elastomeric, indicating that the emulsion polymer had not been crosslinked. The same experiment was repeated except that 2.8 g of the aminofunctional silane was used. The dried film from this experiment was only very slightly elastomeric and it was extremely tacky. Nalco 1115 colloidal silica was added to this emulsion so as to give an emulsion having 10 parts by weight of (dry) silica per 100 parts of polymer. A film cast from this emulsion and dried for 20 hours was not elastomeric.

The same results were obtained when the experiment was repeated using 4.2 g of the aminofunctional silane as crosslinker. The same results were obtained when 1.4 g of aminopropyltriethoxysilane was used as a crosslinker.

EXAMPLE 3

A mixture was prepared by stirring for 2 hours in a 2 liter beaker 450 g of a hydroxyl endblocked polydimethylsiloxane having a viscosity of about 12 Pa.s at 25° C. and about 10 percent of the endblockers being trimethylsiloxy, 50 g of nonionic surfactant (Tergitol (R) TMN-6, and 500 g of water. The mixture was emulsified by passing through a Gaulin laboratory homogenizer for 3 passes at 7500 psi. The resulting emulsion consisted of approximately 45 percent by weight silicone oil in water nonionic emulsion.

A 30 g portion of the above emulsion was weighed into a vial and 0.07 g of stannous octoate and 1.35 g of vinyltrimethoxy was added. The vial was capped and it was shaken for 30 minutes using a laboratory wrist type shaker. The emulsion was allowed to stand undisturbed at room temperature for about 18 hours after which approximately 10 g of the product was poured into a Petri dish. After the emulsion had dried for 24 hours, the resulting film was inspected and found to be an elastomer.

EXAMPLE 4

A sample of a cationically stabilized silicone emulsion was obtained and used in this experiment. The emulsion was 35 percent by weight silicone solids and was stabilized using a cationic emulsion (Arquad T27W).

Ten grams of the silicone emulsion was weighed into a one ounce vial and 0.038 g of stannous octoate, tin II, (Fascat 2003) was added to the emulsion. After mixing, 0.038 g of trifluoropropyltrimethoxysilane was added and the entire mixture was mixed until homogeneous. The concentrations of tin catalyst and alkoxy silane crosslinker added to the emulsion was equal to 1 part per hundred parts of silicone solids in the emulsion. After a 10 minute gestation time, a sample (5 g) of the emulsion was cast into a 3½ inch plastic Petri dish. The following morning the evaporated film was cured, stretchy and elastomeric.

That which is claimed is:

1. An aqueous silicone emulsion stabilized anionically, cationically or nonionically or by a combination which yields an elastomer upon removal of the water comprising (1) 100 parts by weight of anionically, cationically or nonionically stabilized polydiorganosiloxane emulsion, the polydiorganosiloxane having at least two reactive groups per molecule, the organo radicals being monovalent hydrocarbon radicals containing less than 7 carbon atoms per radical or 2-(perfluoroalkyl)ethyl radicals having less than 7 carbon atoms per radical, the reactive groups selected from the atoms or radicals consisting of (a) hydrogen, (b) OR, where R is hydrogen, monovalent hydrocarbon radical or substituted hydrocarbon radical having less than 7 carbon atoms, functionalized hydrocarbon radicals, nitrogen compounds of the formula $-N=CR'_2$ or $-NR'COR'$ or $-NR'_2$, where R' is either hydrogen or monovalent hydrocarbon radicals having less than 7 carbon atoms, (c) groups of the formula —NR$_2$ or —NCOR, where R is as defined above, and (d) halogen, and (g) —O2CR'

(2) from 0.1 to 10 parts by weight of tin (II) catalyst, and, when (1) has only 2 reactive groups per molecule, (3) sufficient vinyltriacetoxysilane crosslinker, the emulsion being able to be filled with either reinforcing or extending fillers or pigments or combinations thereof, the emulsion yielding an elastomer upon evaporation of the water.

2. The emulsion of claim 1 in which (1) has 2 reactive groups per molecule and (3) is present.

3. The emulsion of claim 1 in which there is also present a filler.

4. The emulsion of claim 3 in which the filler is colloidal silica.

5. The emulsion of claim 1 in which the reactive groups of (1) are —O$_2$CR'.

6. The emulsion of claim 5 in which (1) is a mixture of molecules in which some molecules are polydiorganosiloxanes having 2 reactive groups and the remainder of the molecules are polydiorganosiloxanes in which there are 3 or more reactive groups, the crosslinker (3) being an optional ingredient.

7. An aqueous silicone emulsion stabilized anionically, cationically or nonionically or by a combination which yields an elastomer upon removal of the water comprising the product obtained by (A) mixing (1) 100 parts by weight of anionically, cationically or nonionically stabilized polydiorganosiloxane emulsion, the polydiorganosiloxane having at least two reactive groups per molecule, the organo radicals being monovalent hydrocarbon radicals containing less than 7 carbon atoms per radical or 2-(perfluoroalkyl)ethyl radicals having less than 7 carbon atoms per radical, the reactive groups selected from the atoms or radicals consisting of (a) hydrogen, (b) OR, where R is hydrogen, monovalent hydrocarbon radical or substituted hydrocarbon radical having less than 7 carbon atoms, functionalized hydrocarbon radicals, nitrogen compounds of the formula —N=CR'$_2$ or —NR'COR' or —NR'$_2$, where R' is either hydrogen or monovalent hydrocarbon radicals having less than 7 carbon atoms, (c) groups of the formula —NR$_2$ or —NCOR, where R is as defined above, and (d) halogen, and (g) —O$_2$CR', (2) from 0.1 to 10 parts by weight of tin (II) catalyst, and when (1) has only 2 reactive groups per molecule, (3) sufficient vinyltriacetoxysilane crosslinker, then (B) aging at room temperature for sufficient time to allow crosslinking of the polydiorganosiloxane, the emulsion being able to be filled with either reinforcing or extending fillers or pigments or combinations thereof, the emulsion yielding an elastomer upon evaporation of the water.

8. The method of claim 7 in which (1) is emulsified, then (2) is added to the emulsion.

9. The method of claim 7 in which (1) and (2) are mixed and then emulsified.

10. The method of claim 7 in which (1) is emulsified, then (2) and (3) are added to the emulsion.

11. The method of claim 7 in which (1) and (2) are mixed together, emulsified, and then (3) is added.

12. The method of claim 7 in which (1) and (3) are mixed together, emulsified, and then (2) is added.

13. The method of claim 7 in which filler is added to the emulsion (1) before the addition of (2) or (3).

14. The method of claim 8 in which a reinforcing or extending filler is added to (1) before emulsification, the filler being one which does not adversely react in the emulsion.

15. The method of claim 9 in which a reinforcing or extending filler is added to the mixture of (1) and (2) before emulsification, the filler being one which does not adversely react in the emulsion.

16. The method of claim 12 in which a reinforcing or extending filler is added to the mixture of (1) and (3) before emulsification, the filler being one which does not adversely react in the emulsion.

* * * * *